United States Patent [19]

Scholz

[11] 3,808,359

[45] Apr. 30, 1974

[54] PLAYBACK CIRCUIT FOR A THREE LINE SEQUENTIAL COLOR TELEVISION SIGNAL

[75] Inventor: Werner Scholz, Gehrden, Germany

[73] Assignees: TED Bildplatten Aktiengesellschaft; AEG-Telefunken Teldec, both of Zug, Switzerland

[22] Filed: Feb. 15, 1973

[21] Appl. No.: 332,767

[30] Foreign Application Priority Data

Feb. 15, 1972 Germany ............................ 2207021

[52] U.S. Cl. .......................... 178/5.4 CD, 178/5.4 C

[51] Int. Cl. ............................................ H04n 9/02

[58] Field of Search ......... 178/5.4 CD, 5.4 C, 5.4 R

[56] References Cited

UNITED STATES PATENTS

| | | | |
|---|---|---|---|
| 3,440,339 | 4/1969 | Johnson | 178/5.4 CD |
| 3,715,465 | 2/1973 | McMann | 178/5.4 C |

*Primary Examiner*—Richard Murray
*Assistant Examiner*—R. John Godfrey
*Attorney, Agent, or Firm*—Spencer & Kaye

[57] ABSTRACT

A playback circuit for a color television signal wherein the color signals cover a first lower frequency range of the total video bandwidth and appear as three sequential signals each one horizontal picture line in duration and each corresponding to one of the basic colors. The playback circuit has a first signal channel for the processing of the sequential color signals in this first frequency range and a second signal channel responsive to the video signals in a second frequency range which includes the first frequency range. The first signal channel includes a circuit, including a memory, at whose output the sequential signals are simultaneously made available. A circuit is provided for deriving a difference signal from the simultaneously available color signals and the instantaneous sequential input signal to the memory and this difference signal is added to the signal in the second signal channel to cancel out signal differences between three consecutive lines which depend on the color information in the first frequency range.

20 Claims, 7 Drawing Figures

PLAYBACK CIRCUIT FOR A THREE LINE SEQUENTIAL COLOR TELEVISION SIGNAL

BACKGROUND OF THE INVENTION

The recording of an FBAS color television signal (composite color video signal) with simple recording instruments covering a narrow bandwidth is known to be difficult because the frequency of the chrominance subcarrier with 4.4 MHz lies outside the recording bandwidth of approximately 3 MHz of such instruments.

It is known to produce narrow-banded recordings of color television signals (German Published Pat. application DAS No. 1,256,686) by recording the three color signals line by line in sequence and during playback to make these signals available without gaps therebetween by means of a series connection of two delay lines, each having a delay time of one horizontal picture line, and switches which are operated at the horizontal line scanning frequency.

In this connection it is also known (Radio Mentor, Issue No. 12, page 833, 1970) to effect the three line sequential recording only in the lower frequency range of the total video bandwidth and to continuously record a luminance signal Y in the upper frequency range. It is also known during playback to initially split the signal coming from the recording device into two channels as regards its frequencies by means of filters. The first channel passes only the frequencies of the lower frequency range and processes the sequential color signals. The second channel passes only the frequencies in the upper frequency ranges, i.e., it furnishes the high frequencies of the luminance signal. The signals in the second channel are subsequently recombined with the processed, decoded and possibly newly coded signals of the lower frequency range to form, for example, a complete FBAS signal.

In this known circuit, the signal components of the lower frequency range always travel only through the first channel. This has the disadvantage that even with a black and white signal all interferences and errors in the first channel, e.g., distortions from modulators, delay lines and filters, become fully effective in the subsequently recombined signal.

SUMMARY OF THE INVENTION

It is the primary object of the present invention, to improve the last described playback circuit in such a manner that these errors are reduced.

The above object is achieved according to the present invention by providing an improved playback circuit for a color television signal wherein the color signals cover a first lower frequency range of the total video bandwidth and appear as three sequential signals each one horizontal picture line in duration and each corresponding to one of the basic colors. The playback circuit includes a first signal channel for processing the signals in the first frequency range and a second signal channel which is responsive to the video signals of a second frequency range which includes the first frequency range. The first signal channel includes a circuit arrangement, including a memory, which is responsive to the sequential signals for simultaneously providing the three sequential signals at its output. Further circuit means are provided for deriving a difference signal from the simultaneously available color signals and the instantaneous sequential input signal to the memory. Finally a further circuit means is provided for adding this difference signal to the signal in the second signal channel so that signal differences between three consecutive lines depending on the color information in the first frequency range are cancelled out of the signal in the second channel.

A number of different embodiments of the basic invention as well as additional advantageous supplemental features are disclosed.

The present invention advantageously accomplishes that the first channel is effective for the signal transmission only to the extent that is absolutely required. The lower the color saturation, the less the first channel is utilized and the more of the signal transmission takes place over the less complicated second channel which exhibits less errors and interferences. For black and white signals, i.e., when the color saturation equals zero, the first channel is ineffective and the signal transmission takes place only over the second channel. In this case the first channel can be switched off. With this solution all errors, interferences and distortions which may be caused by the first channel along the edges of the picture extending in the line scanning direction are completely eliminated in a simple manner.

DESCRIPTION OF THE PREFERRED EMBODIMENTS

Figure 1:
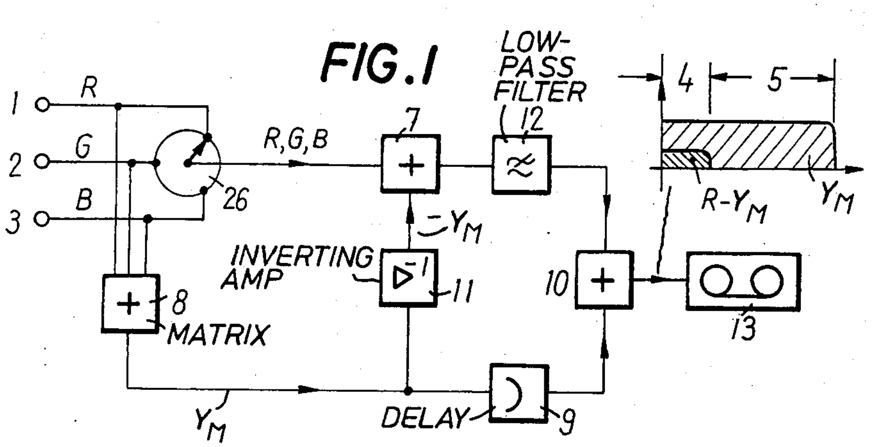
FIG. 1 shows a known recording circuit.

In FIG. 1, three color signals R, G, B which extend over a lower frequency range 4 and an upper frequency range 5 are fed to the input terminals 1, 2 and 3 of the recording circuit to which are connected the three input contacts of a switch 26 having a single output. The switch 26 is operated at the horizontal line scanning frequency, and thus samples each of the color signals for one horizontal picture line. The three line sequential color signals appearing at the output of switch 26 are fed to one input of an adding circuit 7. The three color signals R, G, B are also fed to the inputs of a matrix 8 which combines these signals with the same amplitude ratio to produce a luminance signal $Y_M$ which is fed, via a delay member 9 which serves as a delay compensating member, to one input of an adding circuit 10. Signal $Y_M$ appearing at the output of matrix 8 is also fed to an inverting amplifier 11 which converts the signal $Y_M$ into signal $-Y_M$ which is then fed to the other input of adding circuit 7. Connected to the output of adding circuit 7 is a lowpass filter 12 whose output is connected to the other input of adding circuit 10. The lowpass filter 12 limits the signals $R-Y_M$, $G-Y_M$ and $B-Y_M$ produced in the adding circuit 7 to the lower frequency range 4. Thus at the output of adding circuit 10 there are available the three line sequential signals R, G, B in the lower frequency range 4 and a luminance signal $Y_M$ in frequency range 5. For a black and white signal, the three line sequential signals $(R-Y_M)$, $(G-Y_M)$, $(B-Y_M)$ are equal to zero at the output of the lowpass filter 12 and only signal $Y_M$ reaches the output of adding circuit 10. The output signal of adding circuit 10 is then recorded by means of a recording device 13. In this arrangement the delay member 9 serves to provide compensation for the longer travel time of the signals in the path 26, 7,12 which have a narrower bandwidth than the luminance signal $Y_M$.

Figure 2:
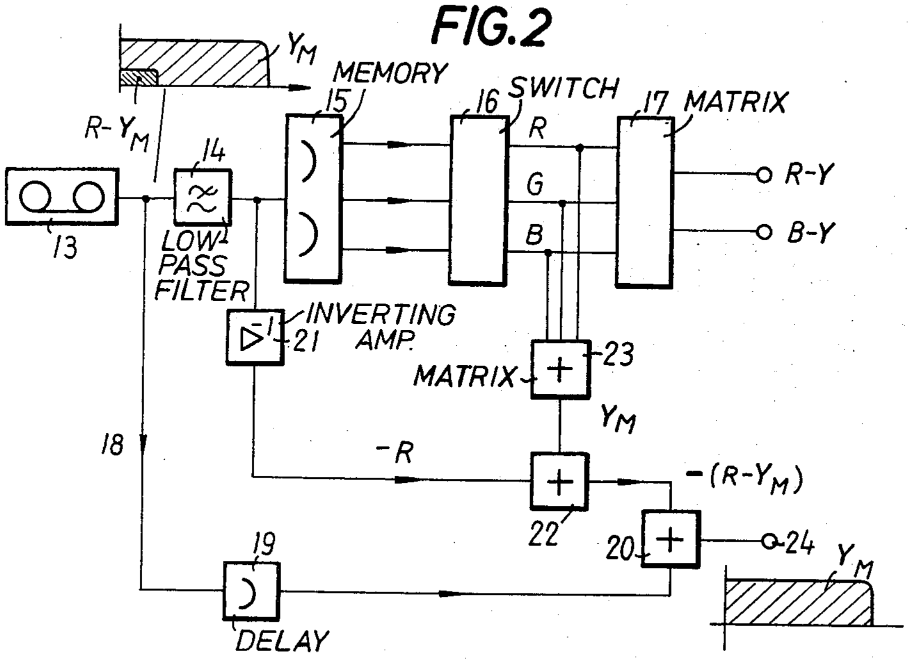
FIG. 2 shows the playback circuit provided for the recording circuit of FIG. 1 according to a first embodiment of the present invention.

FIG. 2 shows a playback circuit for converting the three line sequential signal coming from the recording device 13 into three non-sequential signals Y, R—Y and B—Y required for the picture playback. In a conventional manner the circuit includes a lowpass filter 14 which passes frequency range 4, a memory 15 with two series connected line delay lines and a switch 16 which is operated at the horizontal line scanning frequency and switches the outputs of the memory 15 so as to continuously furnish the color signals R, G, B at its three outputs. These color signals are converted in a matrix 17 to chrominance signals R—Y and B—Y. These circuits together with circuits 21, 22 and 23, which will be discussed below, form the first signal channel.

The playback circuit input signal appearing at the output of recorder 13 is also fed to a second signal channel including a lead 18, a delay member 19 (which serves a purpose similar to delay member 9 of the recording circuit) and an adding circuit or stage 20. According to the present invention this second channel 18, 19, 20, in contradistinction to the known circuits, is also designed to receive the frequency range 4 in that it has no highpass filter.

The sequential color signals R, G, B available at the output of lowpass filter 14 are fed, via a polarity reversing or inverting amplifier 21 to one input of an adding stage 22. The drawing figure shows the signals for a line in which the recording instrument 13 is just furnishing the signal representing the red color component. Color signals R, G, B appearing at the three outputs of switch 16 are also combined in an adder or matrix stage 23 into a signal $Y_M$ which is fed to the other input of adder stage 22. Adder stage 22 thus furnishes at its output the chrominance signal $-(R-Y_M)$ which is then fed to the other input of adder stage 20. Adder stage 20 thus furnishes at its output terminal 24 a luminance signal $Y_M$, which is equal to its input signal after it has been separated from its sequential component.

Figure 3:
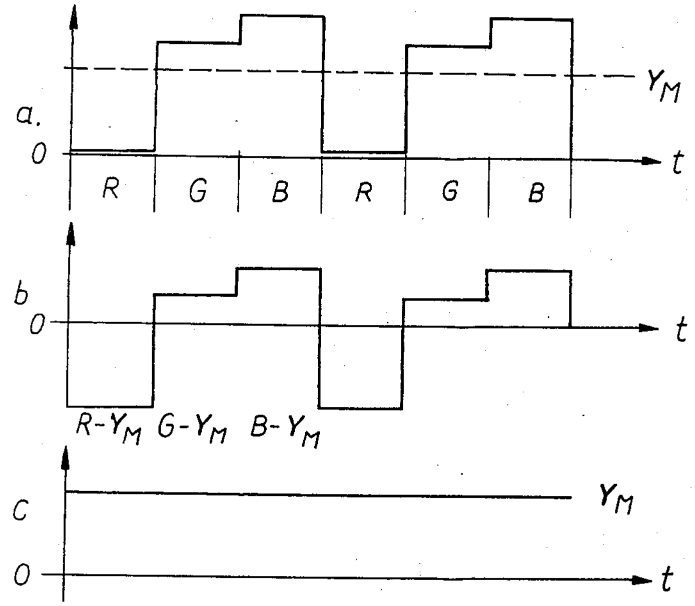
FIG. 3 shows curves used to explain the operation of the circuit according to FIG. 2.

The operation of the circuit according to FIG. 2 will be explained in connection with FIG. 3. FIG. **3*a*** shows the sequential color signals R, G, B for six consecutive lines. It is here assumed that no difference in information exists in the picture between successive lines.

The color signals R, G, B are not identical, which indicates a color picture, since for a black and white picture R = G=B=Y. According to the present invention, the signals $(R-Y_M)$, $(G-Y_M)$ and $(B-Y_M)$ are now produced in adder stage 22 as shown in FIG. **3*b* and are subtracted from the signals in the path 18, 19 in adder stage 20. It can be seen that the subtraction of the difference signals $R-Y_M$, $G-Y_M$, $B-Y_M$ in adder stage 20 results in the luminance signal $Y_M$ being present at terminal 24 for each line as shown in FIG. 3c. Differences in the signals between consecutive lines are thus cancelled out. This means that only a pure black and white luminance signal will always appear at terminal 24 in the desired manner. For a black and white picture, $R = G = B = Y_M = Y$. Consequently, the difference signal $R-Y_M$ at the output of adder stage 22 is then zero, and the signal passing through the second channel 18, 19, 20 remains unchanged. A change in the signal is in fact not desired and not necessary because the signal in the second channel is already a pure black and white signal. The first channel 14–17, 23** furnishes no signal at all in this case because $R-Y=B-Y=0$.

In a fully saturated color picture, the sequential signals $R-Y_M$ etc. may attain particularly high values. In the lower frequency range 4, the wide signal differences are then completely removed in adder stage 20 while the chrominance signals R—Y and B—Y appear at the output of matrix 17. The signal transmission in the lower frequency range 4 is thus distributed differently to the two channels 14–23 and 18–20 depending on the color content. This has the advantage that the first channel 14–23, which produces larger errors and distortions due to the memory 15 and switch 16, is utilized only to the extent required in view of the color saturation. For a black and white signal, the first channel 14–23 can be completely switched off, for example, either automatically by a switching signal which appears only at the absence of color information, or, if desired, manually.

Figure 4:
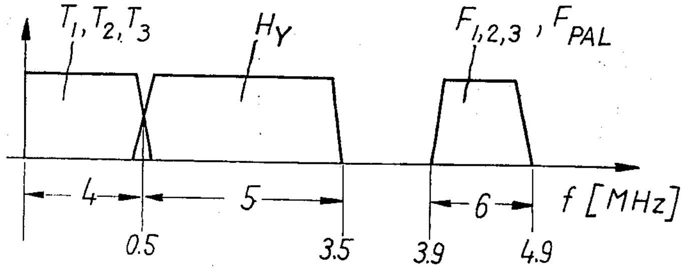
FIG. 4 shows the frequency spectra of the individual signals.

In the following embodiments the signals, as shown in FIG. 4, appear in various frequency ranges. The following symbols are thus introduced to effect a distinction.

T: lower frequency range (4) of the signals;
H: upper frequency range (5) of the signals;
F: chrominance subcarrier frequency signals (frequency range 6).

The signals themselves are indicated as indices to T, H, F.

In this connection

Y = standard luminance signal $[Y = 0.30\ R + 0.59\ G + 0.11\ B]$ $Y_x$ = luminance signal having any desired composition $Y_M$ = luminance signal having equal components of R, G, B $[Y_M = \frac{1}{3}(R + G + B)]$ Index 1 = $R - Y_x + Y$ e.g. $T_1 = T_{R-Y_x+Y}$ Index 2 = $G - Y_x + Y$ Index 3 = $B - Y_x + Y$ $F_1$, $F_2$, $F_3$ corresponds to $T_1$, $T_2$, $T_3$ in chrominance subcarrier frequency form.

$F_{PAL}$ = modulated PAL chrominance subcarrier.

Figure 5:
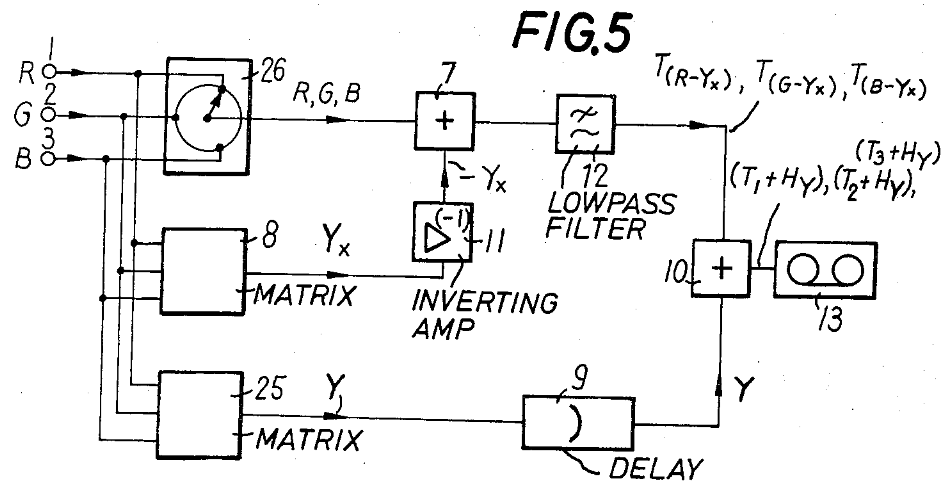
FIG. 5 shows a modified recording circuit.

The recording circuit according to FIG. 5 differs from that of FIG. 1 in that the luminance signal $Y_x$ formed in matrix 8' and fed to adder stage 7 differs in its color components R, G, B from the broadbanded luminance signal Y. The luminance signal Y which is fed to the adder stage 10 in this embodiment is produced in a further matrix 25 and has the standard composition. The luminance signal $-Y_x$ fed to adder stage 7 has any desired composition of R, G, B. Thus the signals shown in FIG. 5, i.e., $(T_1 + H_y)$, $(T_2 + H_y)$ and $(T_3 + H_y)$, appear at the output of adder stage 10.

Figure 6:
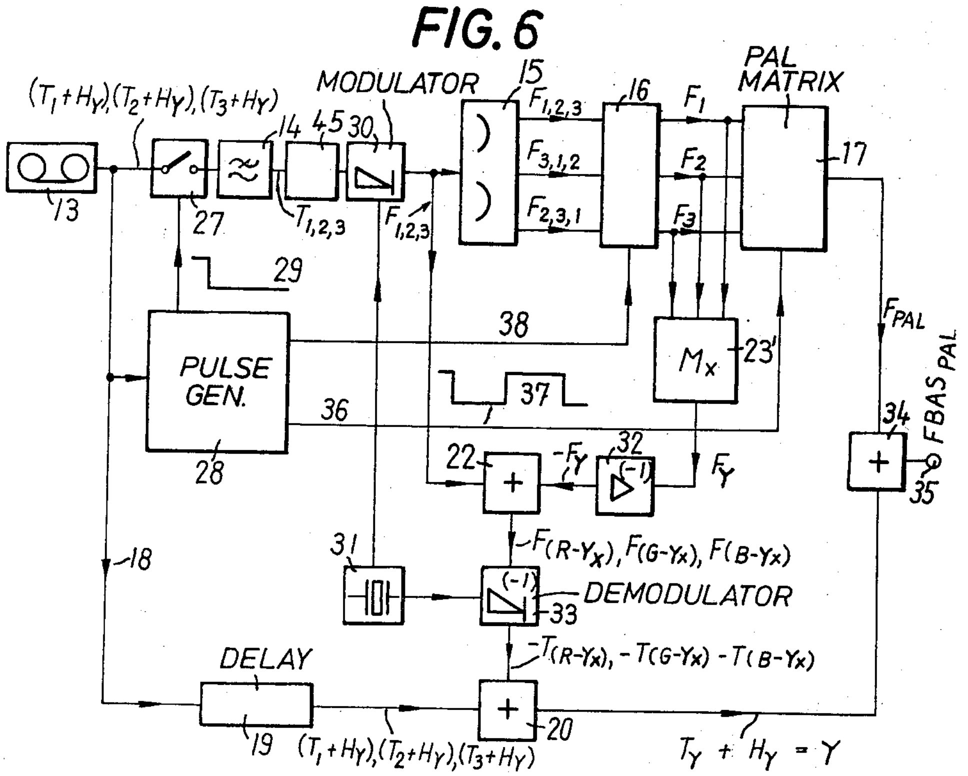
FIG. 6 shows a playback circuit provided for the recording circuit of FIG. 5 according to a further embodiment of the present invention.

FIG. 6 shows a playback circuit according to the present invention for a color picture signal recorded according to FIG. 5. The circuit according to FIG. 6 operates according to the same principle as that of FIG.

2 but with the following variations. According to this embodiment of the invention, a gate 27 is provided in the first signal path before the lowpass filter 14 which gate 27 is continuously blocked upon the presence of a black and white signal by means of a switching voltage 29 appearing at the output of a pulse generator 28 whereby the signal flow in channel 14-17, 33 is interrupted in the desired manner. Connected in the first signal channel between the output of the lowpass filter 14 and the input of memory 15 is a modulator 30. The synchronizing pulses in the signal passing through the first signal channel are removed before they reach modulator 30 by trimming. The synchronizing signal can thus travel only over a second channel 18–20 and can thus not be falsified by the first channel.

Removal of the synchronizing pulses is achieved by a sync separator 45. This may be an amplifier having such a characteristic curve that it amplifies the video signal but does not transmit the sync pulses lying beyond a cut off point. Such a circuit for separating the picture signal and the sync pulses is more fully described in U.S. Pat. No. 3,038,027 issued June 5, 1962.

The sequential signals $T_1$, $T_2$ and $T_3$ appearing at the output of filter 14 are modulated with carrier suppression in the modulator 30 on a carrier signal produced in a carrier frequency generator 31 and are thus placed into the transmission range of the delay lines contained in memory 15. The formation of the luminance signal $F_y$, and the difference signals $F_{R-y_x}$, etc. is here effected in mixer stage 23 and adder stage 22 respectively at the chrominance subcarrier frequency. An inverting amplifier 32 serves to reverse the polarity of the luminance signal $F_Y$ before it is fed to the stage 22. The difference signals produced in stage 22 are demodulated in a demodulator 33 by the addition of the carrier signal produced in generator 31 and are then fed as difference signals $-T$ in frequency range 4 to adder stage 20. The matrix 17 in the illustrated embodiment produces, in a known manner, the PAL chrominance subcarrier $F_{PAL}$ from the signals $F_1$, $F_2$, $F_3$, which subcarrier is combined in adder stage 34 with the luminance signal Y to provide an output signal, which is the FBAS signal, at an output terminal 35.

In addition to voltage 9 for controlling gate 27, the pulse generator 28 additionally furnishes, on a line 36, a half-line frequency switching voltage 37 for the PAL matrix 17 and also, on a line 38, the switching voltages for switch 16. The switching voltage 37 is not provided when an NTSC chrominance subcarrier is produced.

The pulse generator 28 and 28' (FIG. 7) include a sync separator for separating the horizontal and vertical frequency pulses from the complete video signal as is known from a normal television receiver. These horizontal and vertical pulses synchronize appropriate pulse generators producing pulses 29, 37, $V_A$ of the form described. Switching voltage 29 is produced by rectification of a special pulse in the vertical blanking time which pulse indicates black and white transmission and is absent during color transmission.

Circuits for deriving from a three line sequential color television signal such pulses and switching voltages as appear on line 38 for switch 16 are more fully described in U.S. Pat. No. 3,436,469 issued Apr. 1, 1969 and U.S. Pat. No. 3,440,340 issued Apr. 22, 1969. The playback circuit for a three line sequential color television signal having two delay lines each having a delay of one line period is described in U.S. Pat. No. 3,560,635 issued Feb. 2, 1971.

With a black and white signal ($F_1 = F_2 = F_3$), the difference signals at the output of demodulator 33 are zero and the luminance signal Y passes unchanged through the second channel 18–20. Since the difference signals making up the $F_{PAL}$ signal then also equal zero, matrix 17 furnishes no output signal. To eliminate any possible interferences, the first channel 14–17, 33 and gate 27 are blocked in this case as mentioned above by the switching voltage 29 from generator 28.

With a full color saturation, the difference signals at the output of demodulator 33 have particularly high values so that all signal differences between successive lines R, G, B in the frequency range 4 are removed in the second channel 18–20 so that the signal transmission in this frequency range 4 substantially takes place over the sequential first channel 14–33. Between full color saturation and zero color saturation the frequency range 4 is more or less transmissive in the first channel 14 . . . 33.

The circuit according to the present invention has the following significant advantages:

1. Since the second channel 18–20 in contradistinction to known circuits, has the full bandwidth, the entire synchronizing signal can be transmitted directly over the second channel so that the sync pulses can be removed before the modulator 30 or keyed out. Any interference in the sync signal caused by repetition of these pulses in memory 15 is thus eliminated. Moreover, special measures for transmitting the vertical sync signal are not required.

2. It is particularly easy to switch from color to black and white playback in that the first channel 14–17, 33 is simply blocked in the latter case. For example, it is only necessary to block gate 27 by a switching voltage. This can be done automatically by a switching voltage derived from the color sync signal or from a special control signal, or can be done with a manually actuated switch.

Figure 7:
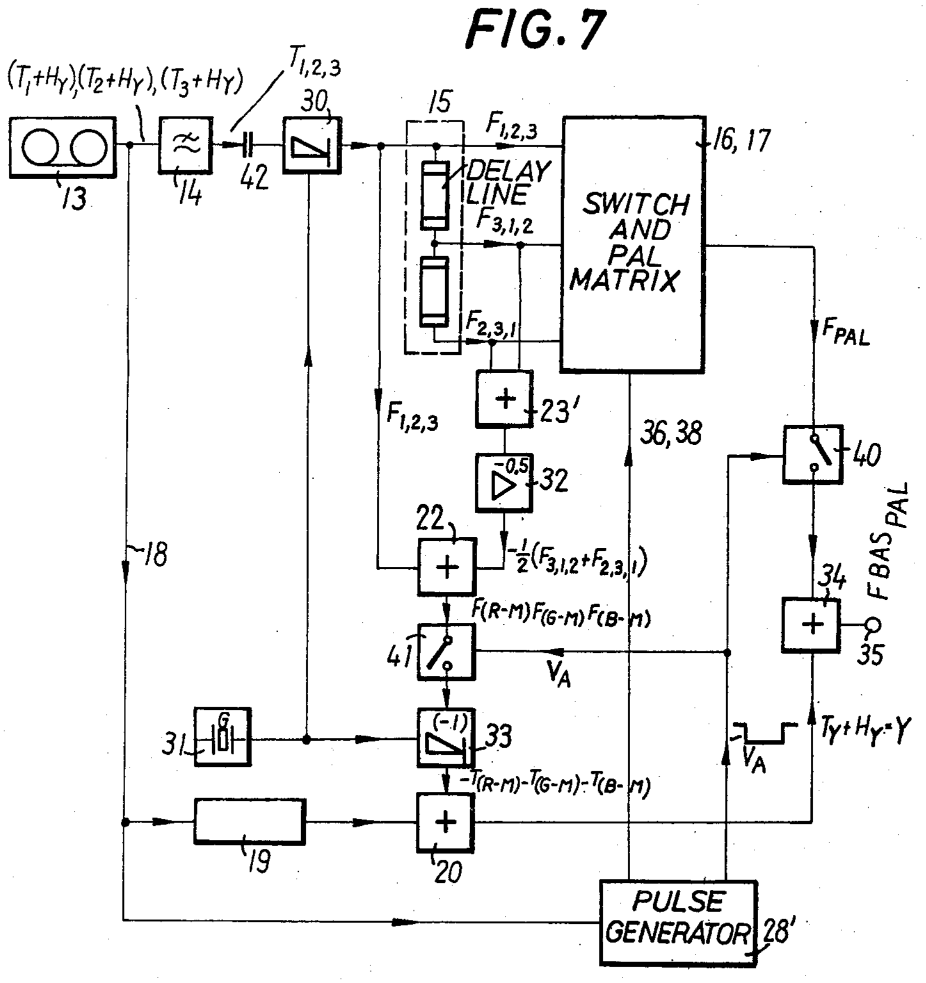
FIG. 7 shows a further embodiment of the present invention.

3. Difference signals are formed at all outputs of the first channel. Thus the influence of the direct voltage component at the input of modulator 30 on the output signals of the first channel disappears. It is thus possible to use a modulation circuit with carrier suppression for modulator 30 without there being the necessity of providing a complicated terminal circuit ahead of this circuit to assure accurate transmission of the direct voltage component. The direct voltage component is advisably not transmitted at all in the first channel in that a capacitor, e.g., capacitor 42 in FIG. 7, is connected in the series signal path ahead of the modulator 30. This capacitor permits signal transmission with minimum carrier amplitudes. Due to the fact that the sync signal can be trimmed before reaching the modulator, the carrier amplitude can be further reduced. With this reduced carrier amplitude the effect of phase and amplitude errors which adversely influence the output signals of the first channel, and which might occur particularly at the delaying devices in memory 15, can be substantially reduced. Consequently the demands for accuracy with regard to phase and amplitude matching in the first channel and for stability are also reduced.

4. The circuit has only one lowpass filter whose frequency characteristic is not very critical. This is contrary to the teachings of the prior art wherein both a lowpass and a highpass filter were required whose frequency characteristics had to be accurately matched. In fact, with the present invention it is sufficient, for example, to form the lowpass filter 14 in the first channel by the memory 15 and the modulator 30 so that the circuit is further simplified. The non-sequential upper frequency range 5 of the signals is suppressed in the difference signal formation in the first channel so that the band width of the signals transmitted in the first channel is substantially determined by the lowpass filter 12 of the recording circuit.

The playback circuit according to FIG. 7 is similar to that of FIG. 6 but differs slightly therefrom in the following manner. In the circuit of FIG. 7, the matrix 23' is directly connected to the output of the memory 15 and is responsive to only the signal which has been delayed by one horizontal picture line in memory 15 ($F_{3,1,2}$) and the signal which has been delayed by two horizontal picture lines ($F_{2,3,1}$). These two signals are simply added in matrix 23' and the sum signal is fed to a polarity inverting amplifier 32 which additionally divides the sum signal in half regarding its amplitude so that the average of the two input signals to the matrix 23' is formed. The average signal appearing at the output of amplifier 32 is then combined with the undelayed signal fed to the input of memory 15 in adder stage 22. The difference signal appearing at the output of stage 20, which after demodulation in demodulator 30 is fed to adder stage 20 thus coincides with the corresponding signal in FIG. 2. To explain this, it is best to start with FIG. 2. Since in FIG. 2 matrix 23 has three identical inputs in order to form signal $Y_M$, this matrix 23 can also be directly connected to the three outputs of memory 15, i.e. before switch 16. Combining the input to memory 15 with the output for the undelayed signal then results in the circuit of FIG. 7. The synchronizing pulses in this embodiment are not removed at the input of the first channel 14–17. As long as no change occurs in the sequence of the synchronizing pulses, i.e., during the picture, these pulses disappear anyhow at the difference signal outputs of the first channel. Interference is thus possibly produced only during the picture changing pulse. In order to eliminate this possible interference two gates 40 and 41 are therefore provided between the output of matrix 17 and the associated input of adder stage 34 and between the output of adder stage 22 and the associated input of adder stage 20 respectively. The gates 40 and 41 are blocked by means of a vertical scanning frequency blanking signal $V_A$ furnished by pulse generator 28 during the vertical blanking period. These two gates 40 and 41 are also blocked during a purely black and white signal. A capacitor 42 removes the direct voltage component of the signals from modulator 30 from the above-mentioned reason.

The blanking pulse $V_A$ preferably begins during the preequalizing pulses and ends at the earliest during the postequalizing pulses. The synchronizing pulses need not be removed from the sequential signal before reaching the input of the modulator 30 of FIG. 7 particularly in the case where the color sync signals are contained in the input signal to the playback device.

Negative color sync signals would be cut off by a simple sync signal trimming. If the color sync signals are not contained in the input signal, then it is advantageous to trim the sync signals at the input of the first channel. The first channel need then be blocked only in the case of black and white transmission. For this a gate at the input of the first channel suffices as it is shown in FIG. 6. The possibly required device for internally producing the color sync signal in the playback circuit is not shown in the block circuit diagrams.

It will be understood that the above description of the present invention is susceptible to various modifications, changes and adaptations, and the same are intended to be comprehended within the meaning and range of equivalents of the appended claims.

I claim:

1. In a playback circuit for a color television signal wherein the color signals cover a first lower frequency range of the total video bandwidth and appear as three sequential signals, each one horizontal picture line in duration and each corresponding to one of the basic colors, said circuit including a first signal channel for the processing of the sequential signals in said first lower frequency range and a second signal channel responsive to the video signals in a second frequency range, said first channel including a first means responsive to said sequential signals and having three outputs for simultaneously providing the three sequential color signals as its output, the improvement wherein said second frequency range includes said first frequency range; and further comprising: second means for deriving a difference signal from the color signals simultaneously provided by said first means and the instantaneous sequential input signal to said first means; and means for adding said difference signal to the signal in said second channel, whereby signal differences between three consecutive lines depending on the color information in said first frequency range, are cancelled out of the signal in said second channel.

2. A playback circuit as defined in claim 1 wherein said second means comprises means for producing a luminance signal from the simultaneously available color signals and means for subtracting said luminance signal from the instantaneous sequential input signal to said memory means.

3. A playback circuit as defined in claim 2 wherein said means for producing a luminance signal comprises means for adding the sequential signals from three successive lines in time.

4. A playback circuit as defined in claim 2 wherein said means for producing a luminance signal produces a luminance signal having the same composition as the luminance signal used to form the sequential color signals during recording.

5. A playback circuit as defined in claim 1 wherein said first means includes: a memory means having a single input for the sequential signals and first, second and third outputs for providing the undelayed sequential signal, the sequential signal delayed by one horizontal picture line and the sequential signal delayed by two horizontal picture lines, respectively; and a switch means connected to said first, second and third outputs for simultaneously providing each of said sequential color signals at a respective output thereof.

6. A playback circuit as defined in claim 5 wherein said second means comprises: means for forming a signal which is the arithmetic mean of the signals appearing at said second and third outputs of said memory means; and means for subtracting said arithmetic mean signal from the undelayed sequential input signal to said memory means.

7. A playback circuit as defined in claim 1 wherein the output signal from said second means is zero when the amplitudes of the signals at said three outputs of said first means are identical.

8. A playback circuit as defined in claim 1 wherein said first channel includes means for removing the sync pulses from the sequential signals.

9. A playback circuit as defined in claim 1 further comprising gate means, connected in said first signal channel, for selectively blocking said first channel.

10. A playback circuit as defined in claim 9 wherein said gate means includes a gate connected in said first signal path before the input to said first circuit means.

11. A playback circuit as defined in claim 9 wherein said gate means includes a first gate connected to the output of said first channel and a second gate connected to the output of said second means.

12. A playback circuit as defined in claim 9 wherein said gate means includes a gate connected in said first signal channel and pulse producing means responsive to the total video input signal to said playback circuit for producing a blanking pulse which blocks said gate, hence said first channel, during the duration of the vertical sync signal.

13. A playback circuit as defined in claim 12 wherein said pulse producing means produces a blanking signal which begins during the pre-equalizing pulses and ends after the post-equalizing pulses in the total video input signal.

14. A playback circuit as defined in claim 9 wherein said gate means blocks said first signal channel when the input video signal to the playback circuit is a black and white signal.

15. A playback circuit as defined in claim 14 wherein said gate means includes a gate connected in said first signal channel and means responsive to the total video input signal to said playback circuit for automatically blocking said gate, and hence said first channel, when a black and white television signal is being received.

16. A playback circuit as defined in claim 1 wherein said first signal channel is constructed so that it is unlimited by filters.

17. A playback circuit as defined in claim 1 wherein said first signal channel further includes a modulating means to whose input the sequential signals are applied and whose output is connected to the input of said first means, for modulating the sequential signals onto a carrier signal; wherein said second means forms said difference signal by carrier addition; and wherein demodulating means are connected between the output of said second means and the associated input of said means for adding said difference signal to the signal in said second channel.

18. A playback circuit as defined in claim 17 wherein said modulating means comprises a suppressed carrier modulator.

19. A playback circuit as defined in claim 18 further including a capacitor connected in series with the input of said modulating means.

20. A playback circuit as defined in claim 17 including means connected in said first signal channel ahead of said modulating means for removing the sync signals from said sequential signals.

* * * * *

UNITED STATES PATENT OFFICE
CERTIFICATE OF CORRECTION

Patent No. 3,808,359 Dated April 30th, 1974

Inventor(s) Werner Scholz

It is certified that error appears in the above-identified patent and that said Letters Patent are hereby corrected as shown below:

In the heading of the patent, lines 5, 6 and 7, change "TED Bildplatten Aktiengesellschaft; AEG-Telefunken Teldec, both of Zug, Switzerland" to --TED Bildplatten Aktiengesellschaft AEG-TELEFUNKEN · TELDEC of Zug, Switzerland--. Column 5, line 29, change "$F_{R-y_x}$" to --$F_{R-Y_x}$--; line 33, change "$F_Y$" to --$F_y$--; line 52, change "generator" to --generators--. Column 7, line 55, change"30 from" to --30 for--. Column 8, line 25, change "as" to --at--.

Signed and sealed this 4th day of February 1975.

(SEAL)
Attest:

McCOY M. GIBSON JR.
Attesting Officer

C. MARSHALL DANN
Commissioner of Patents